United States Patent
Krutzler et al.

(10) Patent No.: US 10,909,208 B2
(45) Date of Patent: *Feb. 2, 2021

(54) SMART CONTENT PRE-LOADING ON CLIENT DEVICES

(71) Applicant: Oath Inc., New York, NY (US)

(72) Inventors: Steve Krutzler, Valencia, CA (US); Edward J. Campbell, III, San Jose, CA (US); Amit Motgi, Cupertino, CA (US); Gamaiel Zavala, Ventura, CA (US); Arons Lee, Santa Monica, CA (US); Devrim Tufan, Sunnyvale, CA (US)

(73) Assignee: Verizon Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,123

(22) Filed: Aug. 19, 2019

(65) Prior Publication Data

US 2019/0370307 A1    Dec. 5, 2019

Related U.S. Application Data

(63) Continuation of application No. 15/997,677, filed on Jun. 4, 2018, now Pat. No. 10,387,523, which is a
(Continued)

(51) Int. Cl.
*G06F 17/00* (2019.01)
*G06F 16/957* (2019.01)
(Continued)

(52) U.S. Cl.
CPC .......... *G06F 16/9574* (2019.01); *G06F 3/033* (2013.01); *G06F 3/0488* (2013.01); *G06F 3/04883* (2013.01); *G06F 2216/13* (2013.01)

(58) Field of Classification Search
CPC .... G06F 16/9574; G06F 3/033; G06F 3/0488; G06F 3/04883
(Continued)

(56) References Cited

U.S. PATENT DOCUMENTS

| 2005/0069225 A1* | 3/2005 | Schneider | ...... H04N 21/234318 382/305 |
|---|---|---|---|
| 2005/0071736 A1* | 3/2005 | Schneider | ............... G06F 16/48 715/201 |

(Continued)

OTHER PUBLICATIONS

Fails et al., Mobile Collaboration: Collaboratively Reading and Creating Children's Stories on Mobile Devices, ACM 2010, pp. 20-29. (Year: 2010).*

(Continued)

*Primary Examiner* — Cong-Lac Huynh
(74) *Attorney, Agent, or Firm* — Cooper Legal Group, LLC

(57) ABSTRACT

A method for smart preloading of content resources on client devices is provided. The method includes operations for presenting an interface running on a client device that includes a plurality of content indicators associated with a plurality of content items. The method includes an operation for selectively preloading into a cache of the client device a resource associated with a content item if the content item has a level of engagement that is greater than that of other content items. According to this embodiment, the level of engagement is a measurement of interaction to the content items by other users associated with the user by, for example, a social network. The method further includes retrieving and using the resource for presenting the content item via the interface such that the content item is presented in less time than if the resource were not preloaded to the cache based on the level of engagement.

20 Claims, 8 Drawing Sheets

Related U.S. Application Data continuation of application No. 14/144,544, filed on Dec. 30, 2013, now Pat. No. 9,990,440.

(51) Int. Cl.
 *G06F 3/0488* (2013.01)
 *G06F 3/033* (2013.01)
(58) Field of Classification Search
 USPC ......................................................... 715/234
 See application file for complete search history.

(56) References Cited

U.S. PATENT DOCUMENTS

| | | | | |
|---|---|---|---|---|
| 2009/0182941 A1* | 7/2009 | Turk | ................... | G06F 12/0862 |
| | | | | 711/118 |
| 2011/0184886 A1* | 7/2011 | Shoham | ............. | G06Q 30/0283 |
| | | | | 705/400 |
| 2013/0054698 A1* | 2/2013 | Lee | .................... | G06Q 30/0267 |
| | | | | 709/204 |
| 2016/0042279 A1* | 2/2016 | Wong | ..................... | G06Q 50/01 |
| | | | | 706/46 |
| 2016/0239468 A1* | 8/2016 | Capt | ....................... | G06F 9/451 |
| 2016/0267550 A1* | 9/2016 | Yan | ..................... | G06Q 30/0251 |
| 2017/0194030 A1* | 7/2017 | Doherty | .................. | G06F 40/14 |
| 2019/0155495 A1* | 5/2019 | Klein | .................. | G06F 3/04883 |
| 2020/0252477 A1* | 8/2020 | Acharya | ............. | G06F 16/9574 |

OTHER PUBLICATIONS

Claros et al., Social Media Learning: an Approach for Composition of Multimedia Interactive Object in a Collaborative Learning Environment, IEEE 2013, pp. 570-575. (Year: 2013).*

Paul et al., Systematic, Large-scale Analysis on the Feasibility of Media Prefetching in Online Social Networks, IEEE 2015, pp. 755-760. (Year: 2015).*

* cited by examiner

SMART CONTENT PRE-LOADING ON CLIENT DEVICES

CLAIM OF PRIORITY

The present patent application is a continuation of U.S. patent application Ser. No. 15/997,677, filed on Jun. 4, 2018, entitled "Smart Content Pre-Loading On Client Devices", which is a continuation of U.S. patent application Ser. No. 14/144,544, filed on Dec. 30, 2013, entitled "Smart Content Pre-Loading On Client Devices". U.S. patent application Ser. No. 15/997,677 and U.S. patent application Ser. No. 14/144,544 are incorporated by reference herein in their entirety.

BACKGROUND

Some browsers, such as Mozilla Firefox, support link prefetching, which is a syntax that can be used in a loading/loaded webpage to provide a hint to a browser about what webpage and/or resource the browser should prefetch and cache in order to anticipate a user's likely navigation. For example, after the first webpage in a multi-page news article is loaded, the browser might pre-fetch and cache the second webpage on the basis of a link-prefetching hint in the first webpage.

By definition, link prefetching is developer-centric, rather than user-centric. That is to say, it does not make use of explicit/implicit user feedback, though present-day mobile and desktop computing devices provide numerous means for gathering such feedback.

SUMMARY

In an example embodiment, a processor-executed method is described. According to the method, an operation for presenting an interface running on a client device is provided where the interface includes a plurality of content indicators associated respectively with a plurality of content items served by one or more servers. The method also includes an operation for selectively preloading into a cache of the client device a resource associated with a content item if the content item has a level of engagement that is greater than that of other content items of the plurality of content items, the level of engagement is a measurement of interaction to select content items by other users that have social connections to the user. The method further provides for retrieving the resource from the cache of the client device when the user selects a content indicator associated with the content item and for using the resource for presenting the content item via the interface. Accordingly, the content item is presented in less time than if the resource were not preloaded to said cache based on said level of engagement. According to these and other embodiments, content indicators enable the user to preview the content item and may include a summary, a thumbnail image, a link, a news feed item, a news stream item, an advertisement, or an icon.

In another example embodiment, another processor-executed method is described. The method provides for delivering for display, by a server, a plurality of content indicators via an interface running on a client device of a user, the plurality of content indicators enable the user to preview a respective plurality of content items to which the plurality of content indicators are associated. The method also provides for obtaining, at the server, data related to levels of engagement of the plurality of content items, the levels of engagement are a measurement of interaction to select content items by other users that have social connections to the user. Moreover, the method provides for selectively sending, from the server to the client device, a resource associated with a content item if the content item has a level of engagement that is greater than that of other content items of the plurality of content items, the resource is configured to be pre-loaded into a cache of the client device. According to this embodiment, when the user selects a content indicator associated with the content item, the content item is presented in less time that if the resource were not sent to the client device based on said level of engagement.

In another embodiment, an apparatus is described, namely, computer-readable media which persistently store a program that runs on a client device. The computer program provides program instructions for presenting an interface running on a client device of a user, the interface includes a plurality of content indicators, the plurality of content indicators enable the user to preview a respective plurality of content items to which the plurality of content indicators link. Additionally, the computer program includes program instructions for selectively preloading into a cache of the client device a resource associated with a content item if the content item has a level of engagement that is greater than that of other content items of the plurality of content items, the level of engagement is a measurement of interaction to select content items by other users that have social connections to the user. Moreover, the computer program includes program instructions for retrieving the resource from the cache of the client device when the user selects a content indicator associated with the content item. Further yet, the computer program includes program instructions for using the resource for presenting the content item via the interface, wherein a duration between when the user selects the content indicator and when the content item is displayed on the interface is less than if the resource were not preloaded to said cache based on said level of engagement.

Other aspects and advantages of the inventions will become apparent from the following detailed description, taken in conjunction with the accompanying drawings, which illustrate by way of example the principles of the inventions.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
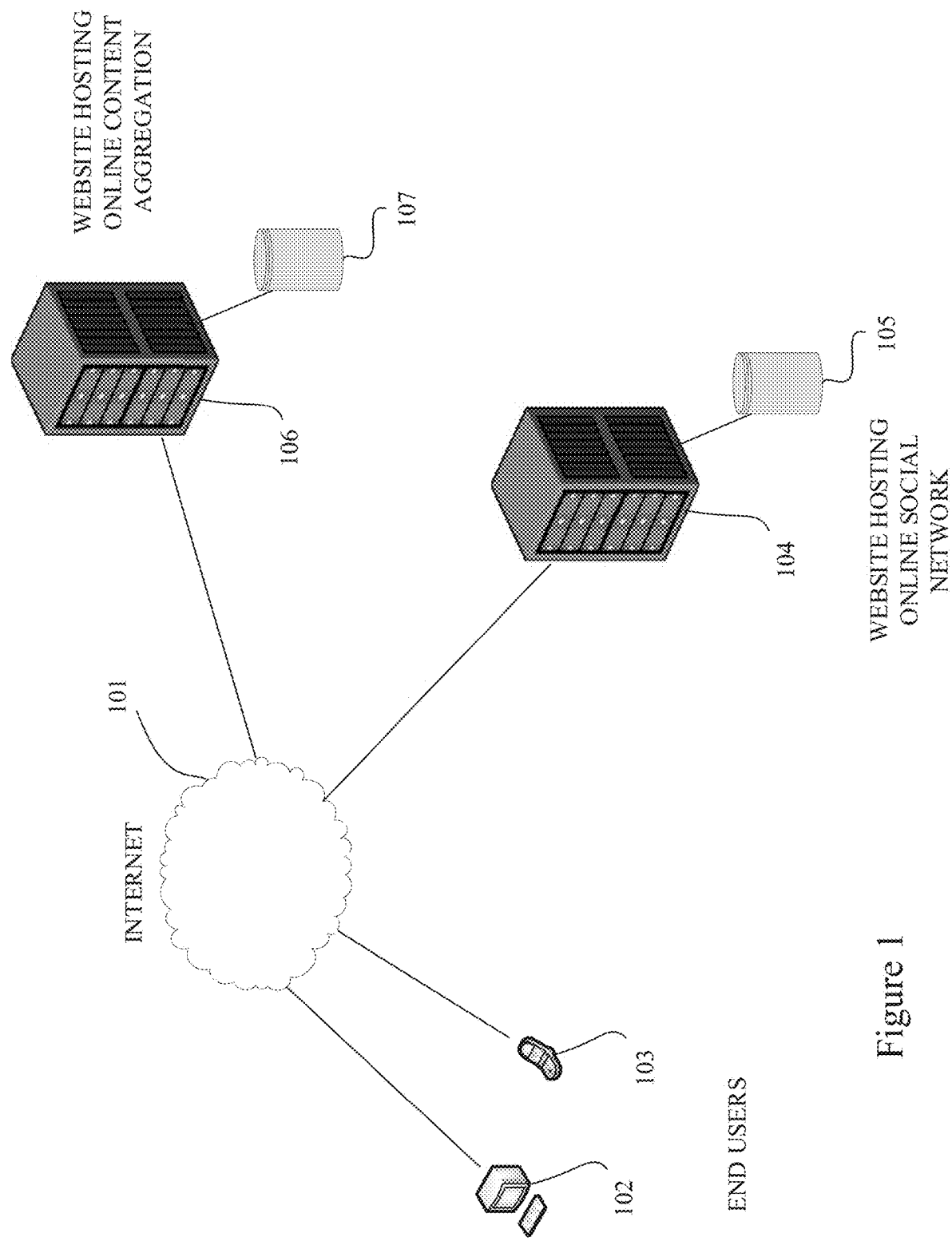
FIG. 1 is a network diagram showing a website hosting an online social network and a website hosting online content aggregation, in accordance with an example embodiment.

FIG. 1 is a network diagram showing a website hosting an online social network and a website hosting online content aggregation, in accordance with an example embodiment. As depicted in this figure, a personal computer 102 (e.g., a laptop or other mobile computer) and a mobile device 103 (e.g., a smartphone such as an iPhone, Android, Windows Phone, etc., or a tablet computer such as an iPad, Galaxy, etc.) are connected by a network 101 (e.g., a wide area network (WAN) including the Internet, which might be wireless in part or in whole) with a website 104 hosting an online social network and a website 106 hosting online content aggregation. As used here and elsewhere in this disclosure, the term "online social network" is to be broadly interpreted to include, for example, any online service, including a social-media service, that allows its users to, among other things, (a) selectively access (e.g., according to a friend list, contact list, buddy list, social graph, or other control list) content (e.g., text, including hyperlinks, images, videos, audio recordings, etc.) associated with each other's profiles (e.g., Facebook walls, Flickr photo albums, Pinterest boards, etc.); (b) selectively (e.g., according to a friend list, contact list, buddy list, social graph, distribution list, or other control list) broadcast content (e.g., text, including hyperlinks, images, videos, audio recordings, etc.) to each other's newsfeeds (e.g., content/activity streams such as Facebook's News Feed, Twitter's Timeline, Google Plus's Stream, etc.); and/or (c) selectively communicate (e.g., according to a friend list, contact list, buddy list, social graph, distribution list, or other control list) with each other (e.g., using a messaging protocol such as email, instant messaging, short message service (SMS), etc.). And as used in this disclosure, the term "online content aggregation" is to be broadly construed to include any online service, including a social-media service, that allows its users to, among other things, access and/or annotate (e.g., comment on) content (e.g., text, including hyperlinks, images, videos, audio recordings, etc.) generated by the online service (e.g., using its own curators and/or its own algorithms) and/or its users and presented in a content stream. Yahoo! News is an example of such an online service. It will be appreciated that a website hosting online content aggregation might have social features based on a friend list, contact list, buddy list, social graph, distribution list, or other control list that is accessed over the network from a social-networking website through an application programming interface (API) exposed by the social networking website. For example, as described in further detail below, Yahoo! News identifies the content items in its newsfeed that have been viewed/read by a user's friends, as identified on a Facebook friend list that the user has authorized Yahoo! News to access.

In an example embodiment, websites 104 and 106 might be composed of a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.), and distributed-computing and/or cloud software such as Map-Reduce, Google File System, Hadoop, Hadoop File System, Pig, Hive, Dremel, CloudBase, etc. The servers in website 104 might be connected to persistent storage 105 and the servers in website 106 might be connected to persistent storage 107. Persistent storage 105 and persistent storage 107 might include flash memory, a redundant array of independent disks (RAID), and/or a storage area network (SAN), in an example embodiment. In an alternative example embodiment, the servers in website 104 and website 106 and/or the persistent storage in persistent storage 105 and persistent storage 107 might be hosted wholly or partially in a public and/or private cloud, e.g., where the cloud resources serve as a platform-as-a-service (PaaS) or an infrastructure-as-a-service (IaaS).

Persistent storage 105 and persistent storage 107 might be used to store data related content (e.g., text, including hyperlinks, images, videos, audio recordings, etc.) and data related to users and their social contacts (e.g., Facebook friends), as well as software including algorithms and other processes for presenting the content to the users in a stream (which might be (a) ranked according to a personalized interestingness algorithm, or (b) chronological). In an example embodiment, some of the data related to content and/or some of the software (e.g., Internet applications, including rich Internet applications or RIAs) stored in persistent storage 105 or persistent storage 107 might have been received from a content delivery or distribution network (CDN), e.g., Akami Technologies. Or, alternatively, some of the data related to content and/or some of the software might be delivered directly from the CDN to the personal computer 102 or the mobile device 103, without being stored in persistent storage 105 or persistent storage 107.

Personal computer 102 and the servers at websites 104 and 106 might include (1) hardware consisting of one or more microprocessors (e.g., from the x86 family, the ARM family, or the PowerPC family), volatile storage (e.g., RAM), and persistent storage (e.g., flash memory, a hard disk, or a solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family or the x86 family), volatile storage (e.g., RAM), and persistent storage (e.g., flash memory such as microSD) and (2) an operating system (e.g., iOS, webOS, Windows Mobile, Android, Linux, Symbian OS, RIM BlackBerry OS, etc.) that runs on the hardware.

Also in an example embodiment, personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and webOS Browser. It will be appreciated that users of personal computer 102 and/or mobile device 103 might use browsers to access content presented by website 104 or website 106. Alternatively, users of personal computer 102 and/or mobile device 103 might use application programs (or apps) to access content presented by website 104 or website 106.

Figure 2:
FIG. 2 is a three-paneled webpage showing a stream of content items in the center panel, in accordance with an example embodiment.

FIG. 2 is a three-paneled webpage showing a stream of content items in the center panel, in accordance with an example embodiment. In an example embodiment, this webpage might be served to a client device by a content-aggregation website (e.g., Yahoo! News). As depicted in this figure, webpage 201 includes three panels: left panel 202, center panel 203, and right panel 204. Left panel 202 includes an ad for Netflix, which is not a targeted ad. Right panel 204 includes a targeted ad for lyft and personalized weather data for Mendocino. Here, it will be appreciated that a targeted ad might be regarded as a form of personalized content, if it is served to a user based on the user's profile/history stored on the content-aggregation website. Center panel 203 includes a stream (or news feed) of content items, e.g., where a content item is a summary of a news article and a related image. As discussed in further detail below, the selection and ordering (from top to bottom) of the content items in the stream might be result an interestingness algorithm, in an example embodiment.

Figure 3A:
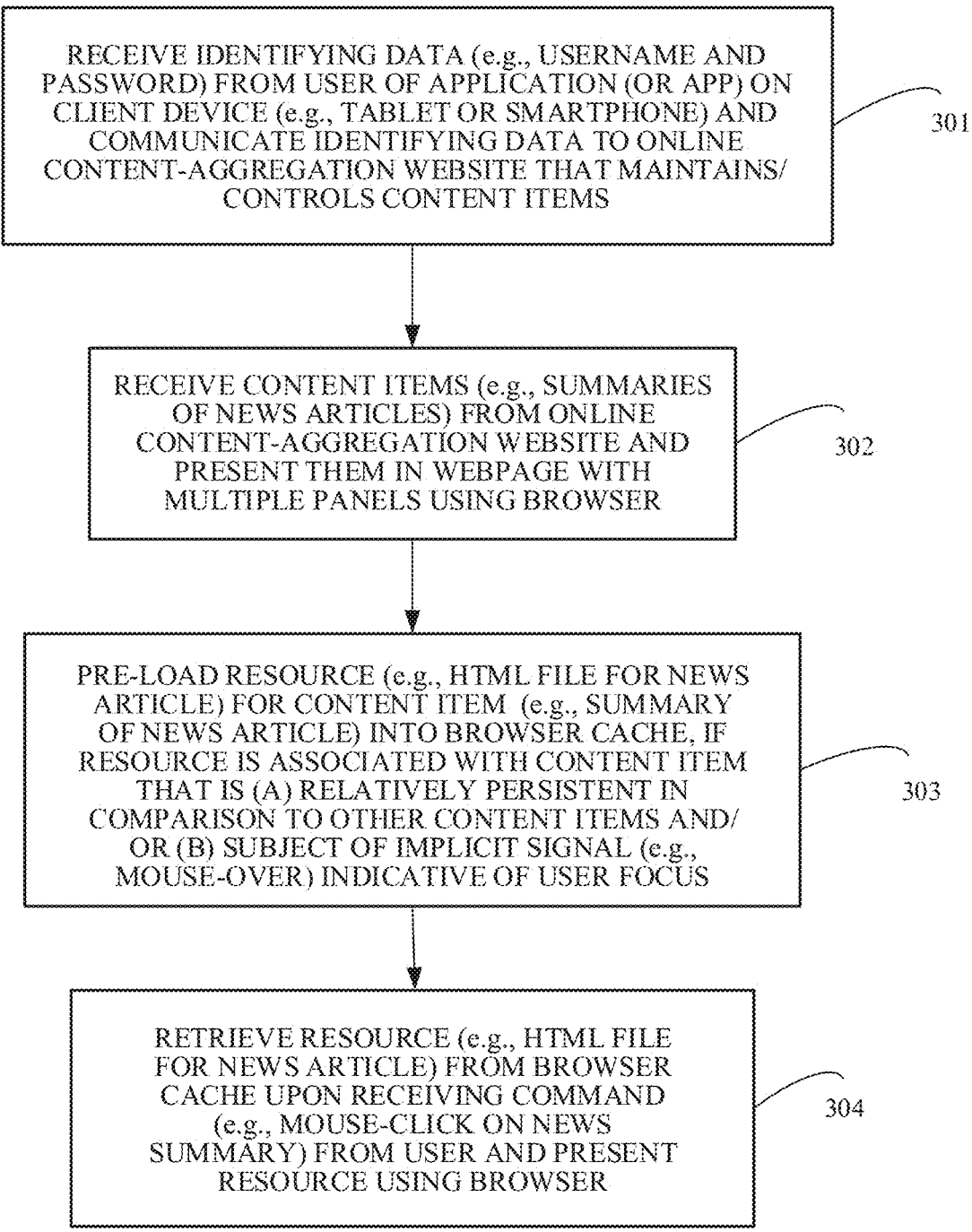
FIG. 3A is a flowchart diagram of a process for browser pre-loading of a resource related to a content item where the pre-loading is based on an implicit signal indicative of user focus, in accordance with an example embodiment.

FIG. 3A is a flowchart diagram of a process for browser pre-loading of a resource related to a content item where the pre-loading is based on an implicit signal indicative of user focus, in accordance with an example embodiment. In an example embodiment, all of the operations in this process might performed by software running on personal computer 102 or mobile device 103, e.g., JavaScript (or another EMAScript language) as rendered executable by a browser. In an alternative embodiment, some of the operations in this process might be performed by software (e.g., a PHP script) running on a server.

As depicted in FIG. 3A, the software receives identifying data (e.g., a username and a password) from a user of a browser on client device (e.g., laptop or smartphone) and communicates the identifying data to an online content-aggregation website that maintains/controls content items, in operation 301. In operation 302, the software receives content items (e.g., summaries of news articles, where each summary might include text and a thumbnail image) from the online content-aggregation website and presents them in a webpage with multiple panels using a browser, e.g., as described above. In operation 303, the software pre-loads a resource (e.g., the HTML file for a news article) into a browser cache, if the resource is associated with a content item that is (A) relatively persistent in comparison to other content items and/or (B) the subject of an implicit signal (e.g., a mouse-over or a mouse-hover) indicative of user focus. The term "implicit" is used here by way of analogy to implicit relevance feedback. Then in operation 304, the software retrieves the resource (e.g., the HTML file for a news article) from the browser cache upon receiving a command (e.g., a mouse-click on a news summary) from the user and presents the resource using the browser.

In operation 303, a resource is pre-loaded into a browser cache if the resource is associated with an implicitly-signaled content item that is relatively persistent in comparison to other content items. In an example embodiment, a content item might be relatively persistent in comparison to other content items if it is not personalized using user data and/or device data. So, for example, in FIG. 2, the news summaries in the stream in center panel 203 are relatively persistent in comparison to the real-time or near real-time temperatures in a particular locale (e.g., Mendocino) in right panel 204 and the targeted ad in right panel 204. Here, it will be appreciated that a targeted ad might be regarded as a form of personalized content, if it is served to a user based on the user's profile/history with the content-aggregation website. Or, a content item might be relatively persistent in comparison to other content items if the content item probably will not change during a specified period time, e.g., in the approximate range of 1-12 hours. Such a probability might be calculated using historical data for similar content items. In another example embodiment, a content item might be relatively persistent in comparison to other content items if it is not subject to explicit relevance feedback by the user. For example, the news summaries in the stream in center panel 203 might not be subject to explicit relevance feedback (e.g., hiding) by the user. But the user might be allowed to change the locale associated with the temperatures in right panel 204 (e.g., by an explicit change to the user's profile with the online content-aggregation website) and the user would expect to see that change immediately confirmed in the locale and temperatures shown in that panel. Otherwise, the user might re-attempt the change.

In the description above, the example of an implicit signal is a mouse-over or mouse-hover. It will be appreciated that a mouse-over or mouse-hover occurs when the user positions a mouse cursor over a content item (e.g., a summary of a news article) or a panel containing a content item for a specified period of time, e.g., in the approximate range of 100-1000 ms (milliseconds). However, other implicit symbols might be used in the same or alternative embodiments. For example, if the client device supports gesture recognition, the implicit signal might be a finger-over or finger-hover or a stylus-over or stylus-hover. And if the client device supports facial or other three-dimensional (3D) recognition and the display associated with the client device is sufficiently large so that a user would re-position his/her head to look at a content item or a panel in the webpage, the implicit signal might be gaze-over or gaze-hover.

As just discussed, a mouse-over or mouse-hover occurs when the when the user positions a mouse cursor over a content item or a panel containing the content item for a specified period of time. In an example embodiment, the specified amount of time might vary from panel to panel. So, for example, if the webpage has three panels as in FIG. 2, the specified amount of time might be in the range of approximately 150 ms for the center panel, approximately 250 ms for the left panel, and 500 ms for the right panel. That is to say, if the mouse-over or mouse-hover lasts lest than 150 ms over the center panel, there will be no pre-loading of a content item in that panel. It will be appreciated that in this example, the lowest specified amount of time is assigned to the panel (e.g., the center panel) that includes the stream, e.g., the news feed. And the highest specified amount of time is assigned to the panel (e.g., the right panel) that includes personalized content items that are not relatively persistent in comparison to other content items.

In an example embodiment, the specified period of time for a mouse-over or mouse-hover might be specified by the developers at the content-aggregation website. Alternatively, in an example embodiment, the specified period of time for a mouse-over or mouse-hover might be specified and dynamically adjusted by machine-learning software (e.g., performing regression analysis with an independent variable of specified time and a dependent variable of probability of mouse-click) at the content-aggregation website. So, for example, initial values such as those discussed above (e.g., 250 ms for the left panel, 150 ms for the center panel, and 500 ms for the right panel) might be set by the machine-learning software. Then, based on user feedback collected and communicated by software on the client device, the machine-learning software might dynamically adjust the initial values (e.g., to 500 ms for the left panel, 100 ms for the center panel, and 400 ms for the right panel). In an example embodiment, the user feedback might take the form of explicit relevance feedback, e.g., likes, hidings, etc., or implicit relevance feedback, namely, mouse-clicks, pageviews, mouse-overs or mouse-hovers, etc.

In operation 303, the software pre-loads a resource into a browser cache and, in operation 304, the software retrieves the resource from the browser cache and presents the resource using the browser. In an example embodiment, the resource might be kept in the browser cache for a specified period of time, e.g., in the approximate range of 30 seconds to 5 minutes, before it is replaced by another resource. Here again, this specified period of time might be specified by the developers at the content-aggregation website. Alternatively, this specified period of time might specified by machine-learning software (e.g., performing regression analysis with an independent variable of specified time and a dependent variable of probability of mouse-click) at the content-aggregation website and dynamically adjusted by that software based on user feedback collected and communicated by software on the client device.

In the description of FIG. 3A above, the example of a resource is the HTML file for a news article. It will be appreciated that such a resource is relatively small in terms of number of bytes and consumes a relatively small amount of bandwidth when the resource is communicated over the network to the client device, in comparison to other resources such as image files, audio and/or video files, etc. Also, such a resource consumes a relatively small amount of storage (e.g., persistent storage) in the browser cache on the client device, in comparison to other resources such as image files, audio and/or video files, etc. However, in an alternative example embodiment, the resource might be a larger file such as an image file or an audio and/or video file. In that example embodiment, the software on the client device might notify the user (e.g., through a graphical user interface (GUI) dialog) that the pre-loading of relatively large resource files could increase the amount of bandwidth and/or storage used by the client device and give the user the option to forego the pre-loading of those files. In this regard, it will be appreciated that more and more Internet-service providers are charging for data bandwidth per the amount used, rather than using a flat fee.

On its face, the flowchart in FIG. 3A describes the operations of software, including a browser, on a client device receiving content items and related resources from a content-aggregation website. In an alternative example embodiment, the software on the client device might receive content items and related resources from a social-networking website, rather than a content-aggregation website. In this regard, it will be appreciated that a content-aggregation website shares many similarities to a social-networking website that maintains an interest graph (e.g., in addition to a social graph), particularly when the content-aggregation website engages in a significant amount of personalization based on user data and/or device data. If such personalization occurs, the user tends to be deciding factor with respect to what content is served, rather than a human or automated curator.

Figure 3B:
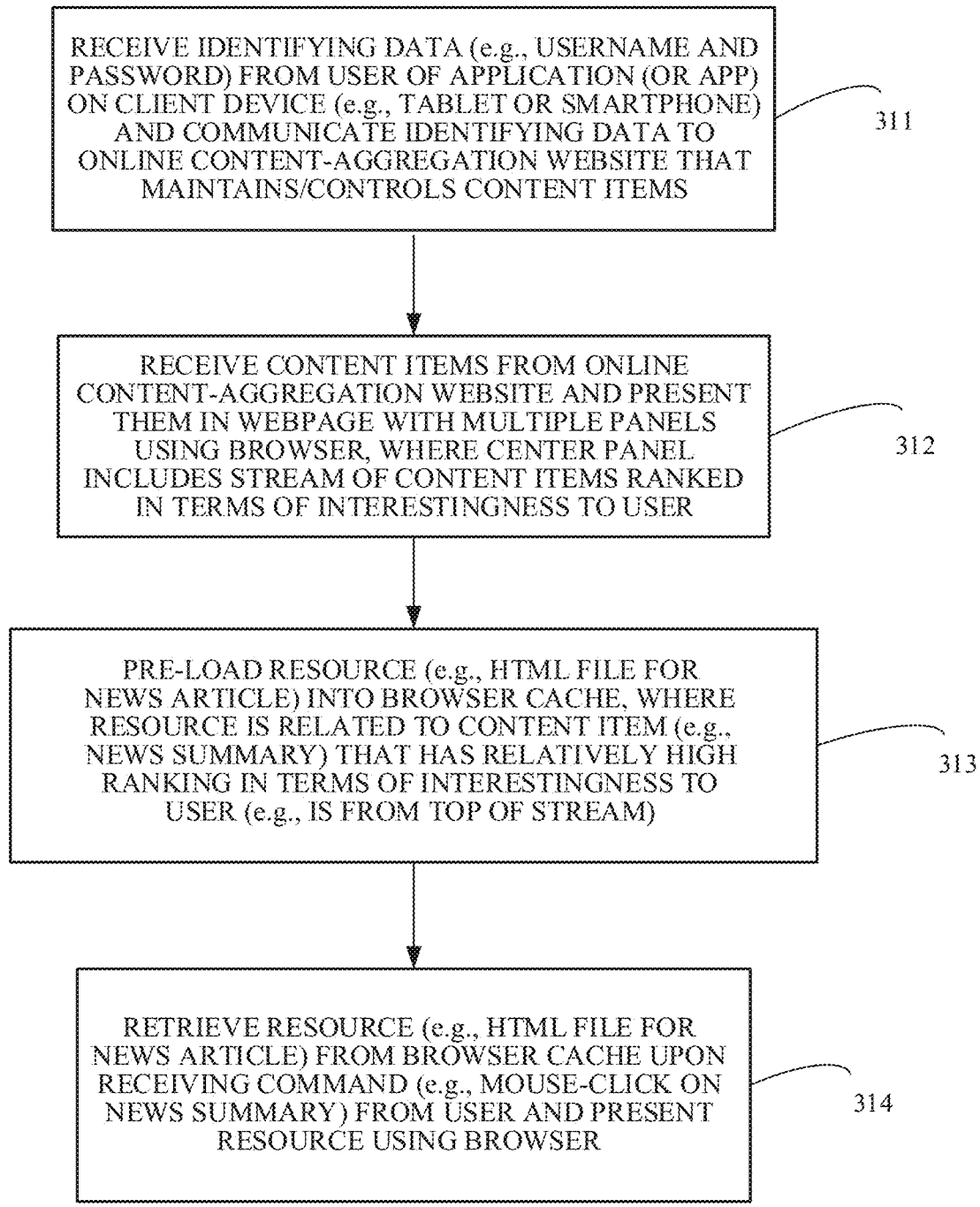
FIG. 3B is a flowchart diagram of a process for browser pre-loading of a resource related to a content item where the pre-loading is based on the content item's interestingness ranking, in accordance with an example embodiment.

FIG. 3B is a flowchart diagram of a process for browser pre-loading of a resource related to a content item where the pre-loading is based on the content item's interestingness ranking, in accordance with an example embodiment. In an example embodiment, all of the operations in this process might performed by software running on personal computer 102 or mobile device 103, e.g., JavaScript (or another EMAScript language) as rendered executable by a browser. In an alternative embodiment, some of the operations in this process might be performed by software (e.g., a PHP script) running on a server.

As depicted in FIG. 3B, the software receives identifying data (e.g., a username and a password) from a user of a browser on a client device (e.g., laptop or smartphone) and communicates the identifying data to an online content-aggregation website that maintains/controls content items, in operation 311. In operation 312, the software receives content items (e.g., summaries of news articles, where each summary might include text and a thumbnail image) from the online content-aggregation website and presents them in a webpage with multiple panels using a browser, e.g., as described above. In operation 313, the software pre-loads a resource (e.g., the HTML file for a news article) into a browser cache, where the resource is related to a content item (e.g., a news summary) that has a relatively high ranking in terms of interestingness to the user (e.g., is from the top of the stream). Then in operation 314, the software retrieves the resource (e.g., the HTML file for a news article) from the browser cache upon receiving a command (e.g., a mouse-click on a news summary) from the user and presents the resource using the browser.

In operation 313, a resource that is related to a relatively highly-ranked content item is pre-loaded into a browser cache. In an example embodiment, the ranking might be in terms of interestingness (or buzzworthiness) to the user, e.g., as determined by an algorithm that uses implicit and explicit relevance feedback, as described above, from the user and other users. For example, Facebook, a social-networking website has used an algorithm called EdgeRank to construct a News Feed that is personalized in terms of interestingness, among other things, for each user profile/history. And Flickr, a social-media website, has disclosed a personalized interestingness algorithm to recommend social media (e.g., images and video) to users. See the personalized interestingness algorithm described in co-owned U.S. Published Patent Application No. 2006/0242139, entitled "Interestingness Ranking of Media Objects". In an alternative example embodiment, the ranking might be in terms of a metric other than interestingness, e.g., relevance to user's profile/history. Or the ranking might be the output of a similarity-based recommender system that uses content-based filtering and/or collaborative filtering.

In operation 313, the software pre-loads a resource into a browser cache and, in operation 314, the software retrieves the resource from the browser cache and presents the resource using the browser. In an example embodiment, the resource might be kept in the browser cache for a specified period of time, e.g., in the approximate range of 30 seconds to 5 minutes, before it is replaced by another resource. Here again, this specified period of time might be specified by the developers at the content-aggregation website. Alternatively, this specified period of time might be specified by machine-learning software at the content-aggregation website and dynamically adjusted by that software based on user feedback collected and communicated by software on the client device.

In the description of FIG. 3B above, the example of a resource is the HTML file for a news article. It will be appreciated that such a resource is relatively small in terms of number of bytes and consumes a relatively small amount of bandwidth when the resource is communicated over the network to the client device, in comparison to other resources such as image files, audio and/or video files, etc. Also, such a resource consumes a relatively small amount of storage (e.g., persistent storage) in the browser cache on the client device, in comparison to other resources such as image files, audio and/or video files, etc. However, in an alternative example embodiment, the resource might be a larger file such as an image file or an audio and/or video file. In that example embodiment, the software on the client device might notify the user (e.g., through a graphical user interface (GUI) dialog) that the pre-loading of relatively large resource files could increase the amount of bandwidth and/or storage used by the client device and give the user the option to forego the pre-loading of those files.

Here again, on its face, the flowchart in FIG. 3B describes the operations of software, including a browser, on a client device receiving content items and related resources from a content-aggregation website. In an alternative example embodiment, the software on the client device might receive content items and related resources from a social-networking website, rather than a content-aggregation website.

Figure 3C:
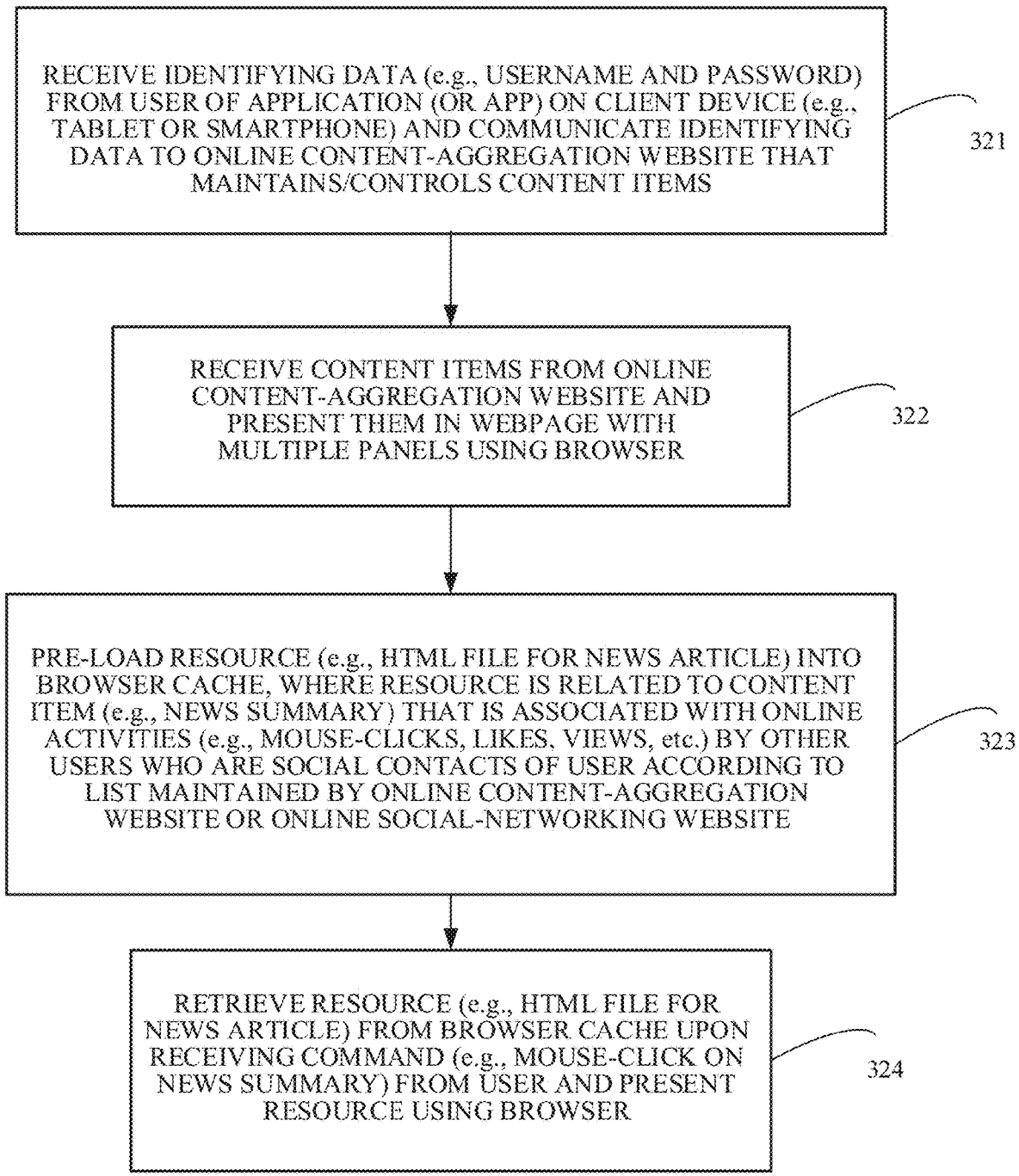
FIG. 3C is a flowchart diagram of a process for browser pre-loading of a resource related to a content item where the pre-loading is based on online activities performed by social contacts of a user, in accordance with an example embodiment.

FIG. 3C is a flowchart diagram of a process for browser pre-loading of a resource related to a content item where the pre-loading is based on online activities performed by social contacts of a user, in accordance with an example embodiment. In an example embodiment, all of the operations in this process might performed by software running on personal computer 102 or mobile device 103, e.g., JavaScript (or another EMAScript language) as rendered executable by a browser. In an alternative embodiment, some of the operations in this process might be performed by software (e.g., a PHP script) running on a server.

As depicted in FIG. 3C, the software receives identifying data (e.g., a username and a password) from a user of a browser on client device (e.g., laptop or smartphone) and communicates the identifying data to an online content-aggregation website that maintains/controls content items, in operation 321. In operation 322, the software receives content items (e.g., summaries of news articles, where each summary might include text and a thumbnail image) from the online content-aggregation website and presents them in a webpage with multiple panels using a browser, e.g., as described above. In operation 323, the software pre-loads a resource (e.g., the HTML file for a news article) into a browser cache, where the resource is related to a content item (e.g., a news summary) that is associated with online activities (e.g., mouse-clicks, likes, views, etc.) by other users who are social contacts (e.g., Facebook friends) of the user according to a list maintained by an online content-aggregation website or an online social-networking website. Then in operation 324, the software retrieves the resource (e.g., the HTML file for a news article) from the browser cache upon receiving a command (e.g., a mouse-click on a news summary) from the user and presents the resource using the browser.

In operation 323, a resource is pre-loaded that is related to a content item that is associated with online activities (e.g., mouse-clicks, likes, views, etc.) by other users who are social contacts of the user according to a list maintained by an online content-aggregation website or an online social-networking website. In an example embodiment, such a list might be obtained by a content-aggregation website from a social-networking website through an application program interface (API) exposed by the social-networking website, following explicit approval by the user (e.g., as obtained through a GUI dialog). For example, a user of Yahoo! News might use a series of GUI dialogs to connect his/her Yahoo! account to his/her Facebook account. And thereafter, Yahoo! News could determine which content items were being clicked on, liked, viewed, etc., by the user's Facebook friends.

In operation 323, the software pre-loads a resource into a browser cache and, in operation 324, the software retrieves the resource from the browser cache and presents the resource using the browser. In an example embodiment, the resource might be kept in the browser cache for a specified period of time, e.g., in the approximate range of 30 seconds to 5 minutes, before it is replaced by another resource. Here again, this specified period of time might be specified by the developers at the content-aggregation website. Alternatively, this specified period of time might specified by machine-learning software at the content-aggregation website and dynamically adjusted by that software based on user feedback collected and communicated by software on the client device.

In the description of FIG. 3C above, the example of a resource is the HTML file for a news article. It will be appreciated that such a resource is relatively small in terms of number of bytes and consumes a relatively small amount of bandwidth when the resource is communicated over the network to the client device, in comparison to other resources such as image files, audio and/or video files, etc. Also, such a resource consumes a relatively small amount of storage (e.g., persistent storage) in the browser cache on the client device, in comparison to other resources such as image files, audio and/or video files, etc. However, in an alternative example embodiment, the resource might be a larger file such as an image file or an audio and/or video file. In that example embodiment, the software on the client device might notify the user (e.g., through a graphical user interface (GUI) dialog) that the pre-loading of relatively large resource files could increase the amount of bandwidth and/or storage used by the client device and give the user the option to forego the pre-loading of those files.

Here again, on its face, the flowchart in FIG. 3C describes the operations of software, including a browser, on a client device receiving content items and related resources from a content-aggregation website. In an alternative example embodiment, the software on the client device might receive content items and related resources from a social-networking website, rather than a content-aggregation website.

In an example embodiment, two or more of the processes shown in FIGS. 3A, 3B, and 3C might be combined into a hybrid process for browser pre-loading of a resource related to a content item. For example, such a hybrid process might pre-load into a browser cache (a) a resource based on an implicit signal indicative of user focus, (b) a resource related to a content item based on the content item's interestingness ranking, and (c) a resource based on online activities performed by social contacts of a user. Or, in example embodiments, a hybrid process might pre-load into a browser cache the resources (a) and (b) or the resources (a) and (c) or the resources (b) and (c).

Figure 4A:
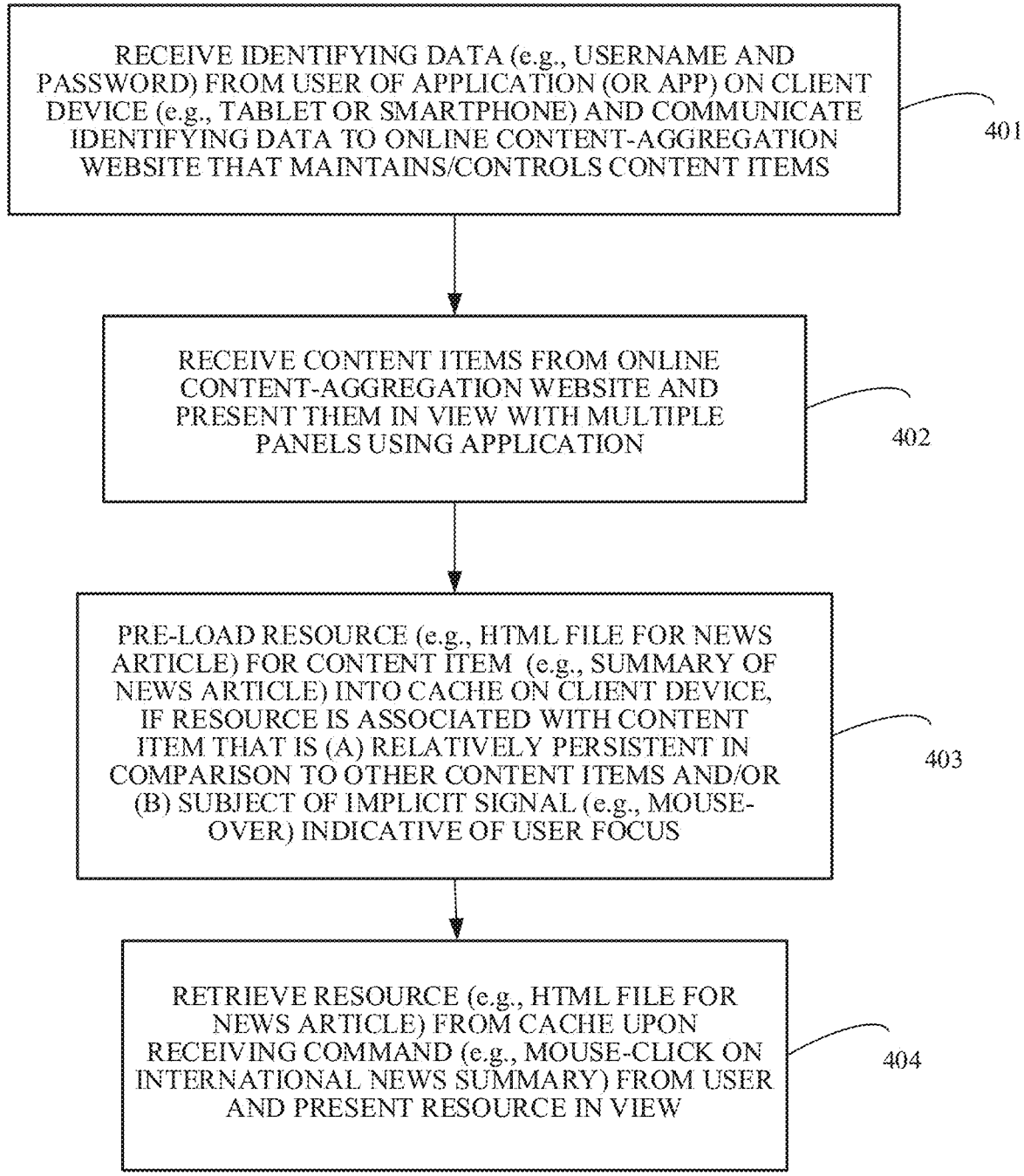
FIG. 4A is a flowchart diagram of a process for application pre-loading of a resource related to a content item where the pre-loading is based on an implicit signal indicative of user focus, in accordance with an example embodiment.

FIG. 4A is a flowchart diagram of a process for application pre-loading of a resource related to a content item where the pre-loading is based on an implicit signal indicative of user focus, in accordance with an example embodiment. In an example embodiment, all of the operations in this process might performed by software running on personal computer 102 or mobile device 103, e.g., an application (or app). In an alternative embodiment, some of the operations in this process might be performed by software (e.g., a PHP script) running on a server.

As depicted in FIG. 4A, the software receives identifying data (e.g., a username and a password) from a user of an application (or app) on client device (e.g., laptop or smartphone) and communicates the identifying data to an online content-aggregation website that maintains/controls content items, in operation 401. In operation 402, the software receives content items (e.g., summaries of news articles, where each summary might include text and a thumbnail image) from the online content-aggregation website and presents them in a view with multiple panels. In operation 403, the software pre-loads a resource (e.g., the HTML file for a news article) into a cache on the client device, if the resource is associated with a content item that is (A) relatively persistent in comparison to other content items and/or (B) the subject of an implicit signal (e.g., a mouse-over or a mouse-hover) indicative of user focus. Then in operation 404, the software retrieves the resource (e.g., the HTML file for a news article) from the cache upon receiving a command (e.g., a mouse-click on a news summary) from the user and presents the resource in a view.

In operation 403, a resource is pre-loaded into the cache if the resource is associated with an implicitly-signaled content item that is relatively persistent in comparison to other content items. In an example embodiment, a content item might be relatively persistent in comparison to other content items if it is not personalized using user data and/or device data. So, for example, in FIG. 2, the news summaries in the stream in center panel 203 are relatively persistent in comparison to the real-time or near real-time temperatures in a particular locale (e.g., Mendocino) in right panel 204 and the targeted ad in right panel 204. Or, a content item might be might be relatively persistent in comparison to other content items if the content item probably will not change during a specified period time, e.g., in the approximate range of 1-12 hours. Such a probability might be calculated using historical data for similar content items. In another example embodiment, a content item might be relatively persistent in comparison to other content items if it is not subject to explicit relevance feedback by the user. For example, the news summaries in the stream in center panel 203 might not be subject to explicit relevance feedback (e.g., hiding) by the user. But the user might be allowed to change the locale associated with the temperatures in right panel 204 (e.g., by an explicit change to the user's profile with the online content-aggregation website) and the user would expect to see that change immediately confirmed in the locale and temperatures shown in that panel. Otherwise, the user might re-attempt the change.

In the description above, the example of an implicit signal is a mouse-over or mouse-hover. It will be appreciated that a mouse-over or mouse-hover occurs when the user positions a mouse cursor over a content item (e.g., a summary of a news article) or a panel containing a content item for a specified period of time, e.g., in the approximate range of 100-1000 ms (milliseconds). However, other implicit symbols might be used in the same or alternative embodiments. For example, if the client device supports gesture recognition, the implicit signal might be a finger-over or finger-hover or a stylus-over or stylus-hover. And if the client device supports facial or other three-dimensional (3D) recognition and the display associated with the client device is sufficiently large so that a user would re-position his/her head to look at a content item or a panel in the view, the implicit signal might be a gaze-over or a gaze-hover.

As just discussed, a mouse-over or mouse-hover occurs when the when the user positions a mouse cursor over a content item or a panel containing the content item for a specified period of time. In an example embodiment, the specified amount of time might vary from panel to panel. So, for example, if the view has three panels as in FIG. 2, the specified amount of time might be in the range of approximately 150 ms for the center panel, approximately 250 ms for the left panel, and 500 ms for the right panel. That is to say, if the mouse-over or mouse-hover lasts lest than 150 ms over the center panel, there will be no pre-loading of a content item in that panel. It will be appreciated that in this example, the lowest specified amount of time is assigned to the panel (e.g., the center panel) that includes the stream, e.g., the news feed. And the highest specified amount of time is assigned to the panel (e.g., the right panel) that includes personalized content items that are not relatively persistent in comparison to other content items.

In an example embodiment, the specified period of time for a mouse-over or mouse-hover might be specified by the developers at the content-aggregation website. Alternatively, in an example embodiment, the specified period of time for a mouse-over or mouse-hover might be specified and dynamically adjusted by machine-learning software (e.g., performing regression analysis with an independent variable of specified time and a dependent variable of probability of mouse-click) at the content aggregation website. So, for example, initial values such as those discussed above (e.g., 250 ms for the left panel, 150 ms for the center panel, and 500 ms for the right panel) might be set by the machine-learning software. Then, based on user feedback collected and communicated by software on the client device, the machine-learning software might dynamically adjust the initial values (e.g., to 500 ms for the left panel, 100 ms for the center panel, and 400 ms for the right panel). In an example embodiment, the user feedback might take the form of explicit relevance feedback, e.g., likes, hidings, etc., or implicit relevance feedback, namely, mouse-clicks, views, mouse-overs or mouse-hovers, etc.

In operation 403, the software pre-loads a resource into a cache and, in operation 404, the software retrieves the resource from the cache and presents the resource in a view. In an example embodiment, the resource might be kept in the cache for a specified period of time, e.g., in the approximate range of 30 seconds to 5 minutes, before it is replaced by another resource. Here again, this specified period of time might be specified by the developers at the content-aggregation website. Alternatively, this specified period of time might specified by machine-learning software at the content-aggregation website and dynamically adjusted by that software based on user feedback collected and communicated by software on the client device.

In the description of FIG. 4A above, the example of a resource is the HTML file for a news article. It will be appreciated that such a resource is relatively small in terms of number of bytes and consumes a relatively small amount of bandwidth when the resource is communicated over the network to the client device, in comparison to other resources such as image files, audio and/or video files, etc. Also, such a resource consumes a relatively small amount of storage (e.g., persistent storage) in the cache on the client device, in comparison to other resources such as image files, audio and/or video files, etc. However, in an alternative example embodiment, the resource might be a larger file such as an image file or an audio and/or video file. In that example embodiment, the software on the client device might notify the user (e.g., through a graphical user interface (GUI) dialog) that the pre-loading of relatively large resource files could increase the amount of bandwidth and/or storage used by the client device and give the user the option to forego the pre-loading of those files.

On its face, the flowchart in FIG. 4A describes the operations of software on a client device receiving content items and related resources from a content-aggregation website. In an alternative example embodiment, the software on the client device might receive content items and related resources from a social-networking website, rather than a content-aggregation website.

Figure 4B:
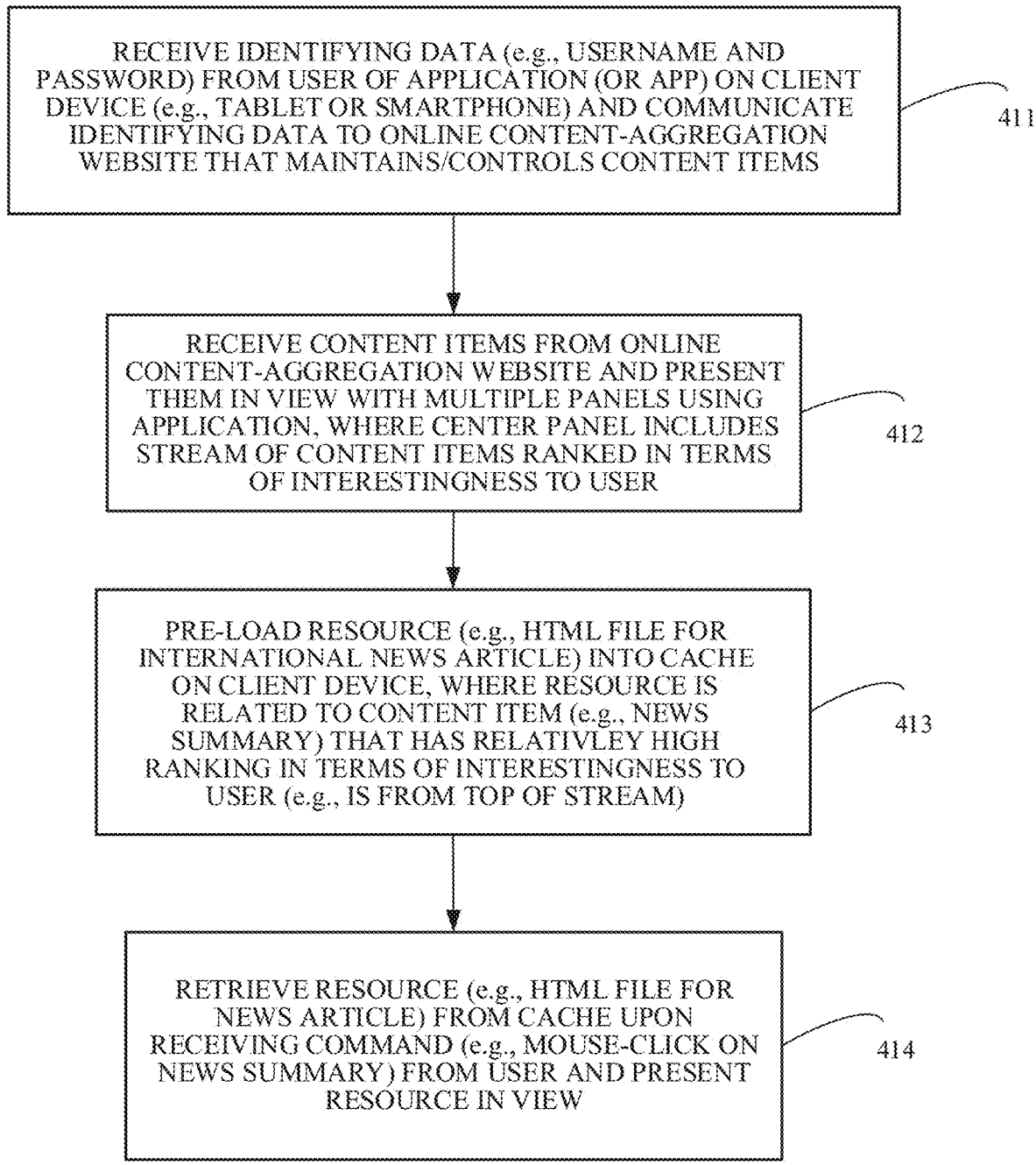
FIG. 4B is a flowchart diagram of a process for application pre-loading of a resource related to a content item where the pre-loading is based on the content item's interestingness ranking, in accordance with an example embodiment.

FIG. 4B is a flowchart diagram of a process for application pre-loading of a resource related to a content item where the pre-loading is based on the content item's interestingness ranking, in accordance with an example embodiment. In an example embodiment, all of the operations in this process might performed by software running on personal computer 102 or mobile device 103, e.g., an application (or app). In an alternative embodiment, some of the operations in this process might be performed by software (e.g., a PHP script) running on a server.

As depicted in FIG. 4B, the software receives identifying data (e.g., a username and a password) from a user of an application (or app) on a client device (e.g., laptop or smartphone) and communicates the identifying data to an online content-aggregation website that maintains/controls content items, in operation 411. In operation 412, the software receives content items (e.g., summaries of news articles, where each summary might include text and a thumbnail image) from the online content-aggregation website and presents them in a view with multiple panels. In operation 413, the software pre-loads a resource (e.g., the HTML file for a news article) into a cache on the client device, where the resource is related to a content item (e.g., a news summary) that has a relatively high ranking in terms of interestingness to the user (e.g., is from the top of the stream). Then in operation 414, the software retrieves the resource (e.g., the HTML file for a news article) from the cache upon receiving a command (e.g., a mouse-click on a news summary) from the user and presents the resource in a view.

In operation 413, a resource that is related to a relatively highly-ranked content item is pre-loaded into a cache. In an example embodiment, the ranking might be in terms of interestingness (or buzzworthiness) to the user, e.g., as determined by an algorithm that uses implicit and explicit relevance feedback, as described above, from the user and other users.

In operation 413, the software pre-loads a resource into a cache and, in operation 414, the software retrieves the resource from the cache and presents the resource in a view. In an example embodiment, the resource might be kept in the cache for a specified period of time, e.g., in the approximate range of 30 seconds to 5 minutes, before it is replaced by another resource. Here again, this specified period of time might be specified by the developers at the content-aggregation website. Alternatively, this specified period of time might specified by machine-learning software at the content-aggregation website and dynamically adjusted by that software based on user feedback collected and communicated by software on the client device.

In the description of FIG. 4B above, the example of a resource is the HTML file for a news article. It will be appreciated that such a resource is relatively small in terms of number of bytes and consumes a relatively small amount of bandwidth when the resource is communicated over the network to the client device, in comparison to other resources such as image files, audio and/or video files, etc. Also, such a resource consumes a relatively small amount of storage (e.g., persistent storage) in the cache on the client device, in comparison to other resources such as image files, audio and/or video files, etc. However, in an alternative example embodiment, the resource might be a larger file such as an image file or an audio and/or video file. In that example embodiment, the software on the client device might notify the user (e.g., through a graphical user interface (GUI) dialog) that the pre-loading of relatively large resource files could increase the amount of bandwidth and/or storage used by the client device and give the user the option to forego the pre-loading of those files.

Here again, on its face, the flowchart in FIG. 4B describes the operations of software on a client device receiving content items and related resources from a content-aggregation website. In an alternative example embodiment, the software on the client device might receive content items and related resources from a social-networking website, rather than a content-aggregation website.

Figure 4C:
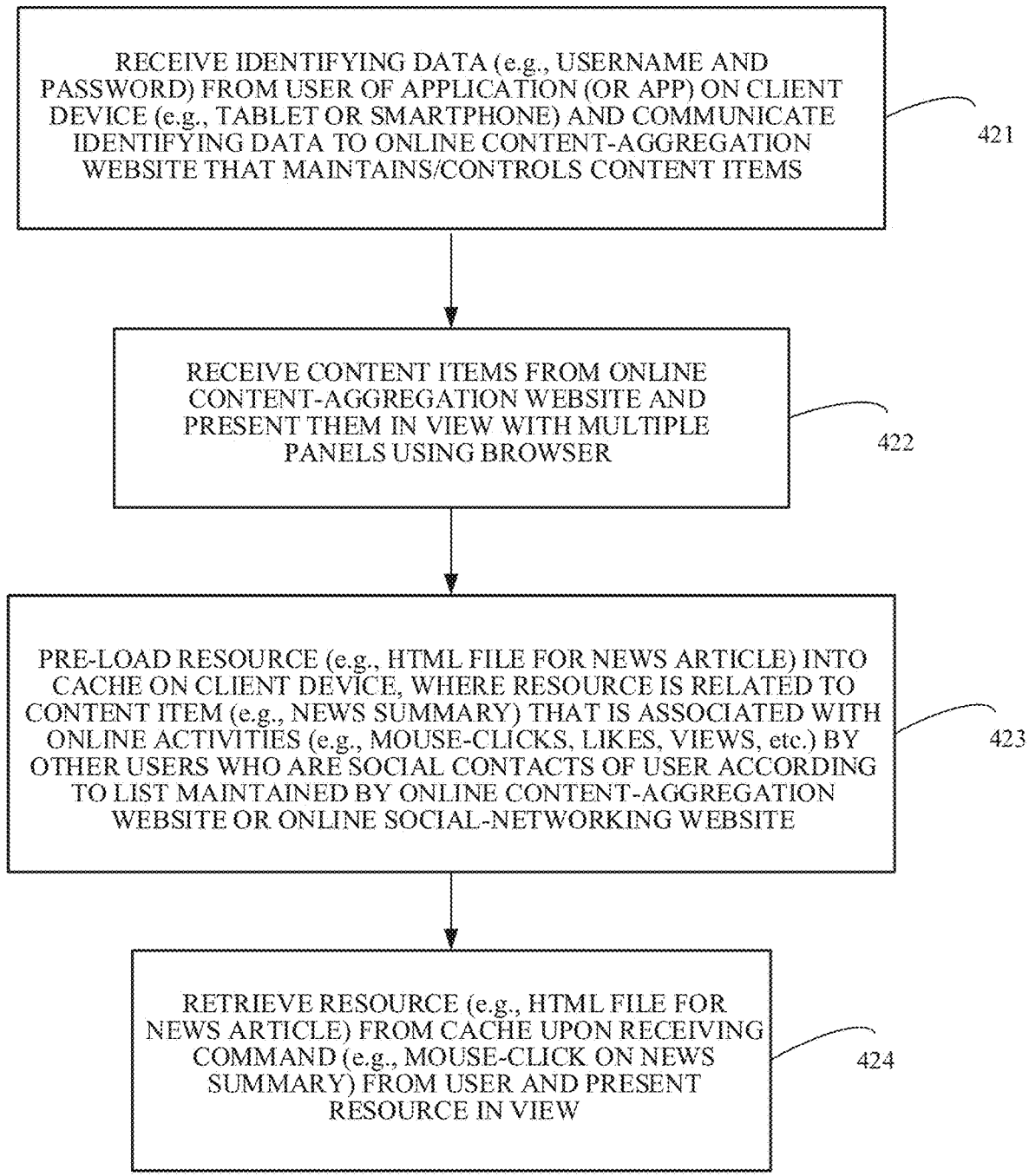
FIG. 4C is a flowchart diagram of a process for application pre-loading of a resource related to a content item where the pre-loading is based on online activities performed by social contacts of a user, in accordance with an example embodiment.

FIG. 4C is a flowchart diagram of a process for application pre-loading of a resource related to a content item where the pre-loading is based on online activities performed by social contacts of a user, in accordance with an example embodiment. In an example embodiment, all of the operations in this process might performed by software running on personal computer 102 or mobile device 103, e.g., an application (or app). In an alternative embodiment, some of the operations in this process might be performed by software (e.g., a PHP script) running on a server.

As depicted in FIG. 4C, the software receives identifying data (e.g., a username and a password) from a user of an application (or app) on a client device (e.g., laptop or smartphone) and communicates the identifying data to an online content-aggregation website that maintains/controls content items, in operation 421. In operation 422, the software receives content items (e.g., summaries of news articles, where each summary might include text and a thumbnail image) from the online content-aggregation website and presents them in a view with multiple panels. In operation 423, the software pre-loads a resource (e.g., the HTML file for a news article) into a cache on the client device, where the resource is related to a content item (e.g., a news summary) that is associated with online activities (e.g., mouse-clicks, likes, views, etc.) by other users who are social contacts (e.g., Facebook friends) of the user according to a list maintained by an online content-aggregation website or an online social-networking website. Then in operation 424, the software retrieves the resource (e.g., the HTML file for a news article) from the cache upon receiving a command (e.g., a mouse-click on a news summary) from the user and presents the resource in a view.

In operation 423, a resource is pre-loaded that is related to a content item that is associated with online activities (e.g., mouse-clicks, likes, views, etc.) by other users who are social contacts of the user according to a list maintained by an online content-aggregation website or an online social-networking website. In an example embodiment, such a list might be obtained by a content-aggregation website from a social-networking website through an application program interface (API) exposed by the social-networking website, following explicit approval by the user (e.g., as obtained through a GUI dialog). For example, a user of Yahoo! News might use a series of GUI dialogs to connect his/her Yahoo! account to his/her Facebook account. And thereafter, Yahoo! News could determine which content items were being clicked on, liked, viewed, etc., by the user's Facebook friends.

In operation 423, the software pre-loads a resource into a cache and, in operation 424, the software retrieves the resource from the cache and presents the resource in a view.

In an example embodiment, the resource might be kept in the cache for a specified period of time, e.g., in the approximate range of 30 seconds to 5 minutes, before it is replaced by another resource. Here again, this specified period of time might be specified by the developers at the content-aggregation website. Alternatively, this specified period of time might specified by machine-learning software at the content-aggregation website and dynamically adjusted by that software based on user feedback collected and communicated by software on the client device.

In the description of FIG. 4C above, the example of a resource is the HTML file for a news article. It will be appreciated that such a resource is relatively small in terms of number of bytes and consumes a relatively small amount of bandwidth when the resource is communicated over the network to the client device, in comparison to other resources such as image files, audio and/or video files, etc. Also, such a resource consumes a relatively small amount of storage (e.g., persistent storage) in the cache on the client device, in comparison to other resources such as image files, audio and/or video files, etc. However, in an alternative example embodiment, the resource might be a larger file such as an image file or an audio and/or video file. In that example embodiment, the software on the client device might notify the user (e.g., through a graphical user interface (GUI) dialog) that the pre-loading of relatively large resource files could increase the amount of bandwidth and/or storage used by the client device and give the user the option to forego the pre-loading of those files.

Here again, on its face, the flowchart in FIG. 4C describes the operations of software on a client device receiving content items and related resources from a content-aggregation website. In an alternative example embodiment, the software on the client device might receive content items and related resources from a social-networking website, rather than a content-aggregation website.

In an example embodiment, two or more of the processes shown in FIGS. 4A, 4B, and 4C might be combined into a hybrid process for cache pre-loading of a resource related to a content item. For example, such a hybrid process might pre-load into a cache (a) a resource based on an implicit signal indicative of user focus, (b) a resource related to a content item based on the content item's interestingness ranking, and (c) a resource based on online activities performed by social contacts of a user. Or, in example embodiments, a hybrid process might pre-load into a cache the resources (a) and (b) or the resources (a) and (c) or the resources (b) and (c).

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the website providing the content items might be an online publication or an online retailer/wholesaler, rather than a content-aggregation website or a social-networking website. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

The invention claimed is:

1. A method, comprising:
presenting an interface running on a client device of a user, the interface comprising one or more content indicators associated with one or more content items;
selectively preloading into a cache of the client device a resource associated with a content item based on a level of engagement of the content item, wherein the level of engagement is a measurement of interaction to select content items by one or more users that have social connections to the user;
retrieving the resource from the cache of the client device in response to a selection of a content indicator associated with the content item; and
presenting the content item via the interface using the resource.

2. The method of claim 1, wherein if a second level of engagement of a second content item is lower than levels of engagements of two or more content items, then a second resource associated with the second content item is not preloaded into the cache.

3. The method of claim 1, wherein the one or more content indicators provide one or more previews of the one or more content items, wherein the one or more content indicators comprise at least one of a summary, a thumbnail image, a link, a news feed item, a news stream item, an advertisement, or an icon.

4. The method of claim 1, wherein the one or more content items comprise at least one of broadcast content, text, hyperlinks, images, videos, audio recordings, social network content, blog content, articles, stories, webpages, or online content aggregation content.

5. The method of claim 1, wherein the resource comprises at least one of an HTML file, an image file, a video file, or an audio file.

6. The method of claim 1, wherein the measurement of interaction to select content items is based on at least one of a number of clicks associated with the content item, a number of likes associated with the content item, or a number of views associated with the content item.

7. The method of claim 1, wherein one or more levels of engagement of the one or more content items are obtained through an application programming interface (API) exposed by a social networking website.

8. The method of claim 1, wherein the selectively preloading is based on whether the content item has a level of persistence that is higher than levels of persistence of one or more other content items, the level of persistence based on an extent to which the content item is identified as not changing during a specified time.

9. The method of claim 1, wherein the selectively preloading is based on an interestingness ranking associated with the content item and wherein the interestingness ranking is determined by an algorithm that uses at least one of implicit relevance feedback or explicit relevance feedback from the user and the one or more users that have social connections to the user.

10. The method of claim 1, wherein the selectively preloading into the cache is based on identifying whether the user has given an implicit signal with respect to the content indicator lasting for a specified duration, the implicit signal comprising at least one of a mouse-over, a stylus-over, a finger-over, or a gaze.

11. A method, comprising:
delivering for display, by a server, one or more content indicators via an interface running on a client device of a user, the one or more content indicators associated with a preview of one or more content items;
obtaining, at the server, data related to levels of engagement of the one or more content items, wherein the levels of engagement are measurements of interaction to select content items by one or more users that have social connections to the user; and
selectively sending, from the server to the client device, a resource associated with a content item based on a level of engagement of the content item, the resource configured to be pre-loaded into a cache of the client device.

12. The method of claim 11, wherein when a second level of engagement of a second content item is lower than second levels of engagement of two or more content items, a second resource associated with the second content item is not sent to the client device.

13. The method of claim 11, wherein the one or more content indicators comprise at least one of a summary, a thumbnail image, a link, a news feed item, a news stream item, an advertisement, or an icon.

14. The method of claim 11, wherein the one or more content items comprise at least one of broadcast content, text, hyperlinks, images, videos, audio recordings, social network content, blog content, articles, stories, webpages, or online content aggregation content.

15. The method of claim 11, wherein the resource comprises at least one of an HTML file, an image file, a video file, or an audio file.

16. The method of claim 11, wherein the measurements of interaction to select content items are based on at least one of a number of clicks associated with the content item, a number of likes associated with the content item, or a number of views associated with the content item.

17. The method of claim 11, wherein the data related to the levels of engagement of the one or more content items is obtained through an application programming interface (API) exposed by a social networking website.

18. The method of claim 11, wherein the selectively sending is based on whether the content item has a level of persistence that is higher than levels of persistence of one or more other content items, the level of persistence is based on an extent to which the content item is identified as not changing during a specified time.

19. The method of claim 11, wherein the selectively sending the resource is based on identifying whether the user has given an implicit signal with respect to a content indicator lasting for a specified duration, the implicit signal comprising at least one of a mouse-over, a stylus-over, a finger-over, or a gaze.

20. A non-transitory computer-readable storage medium storing a computer program executable by a processor-based system, comprising:
presenting an interface running on a client device of a user, the interface comprising one or more content indicators, the one or more content indicators associated with a preview of one or more content items; and
selectively preloading into a cache of the client device a resource associated with a content item in response to the content item having a level of engagement that is greater than that of other content items of the one or more content items, wherein the level of engagement is a measurement of interaction to select content items by other users that have social connections to the user.

* * * * *